US 6,685,802 B1

(12) United States Patent
Nazzer

(10) Patent No.: US 6,685,802 B1
(45) Date of Patent: Feb. 3, 2004

(54) PROCESS AND APPARATUS FOR REMOVING DISSOLVED AND UNDISSOLVED SOLIDS FROM LIQUIDS

(76) Inventor: Craig Nazzer, P.O. Box 933, New Plymouth (NZ)

( * ) Notice: Subject to any disclaimer, the term of this patent is extended or adjusted under 35 U.S.C. 154(b) by 0 days.

(21) Appl. No.: 09/807,648

(22) PCT Filed: Oct. 15, 1999

(86) PCT No.: PCT/NZ99/00174

§ 371 (c)(1),
(2), (4) Date: Jul. 2, 2001

(87) PCT Pub. No.: WO00/21631

PCT Pub. Date: Apr. 20, 2000

(30) Foreign Application Priority Data

Oct. 15, 1998 (NZ) ................................. 332331

(51) Int. Cl.⁷ .............................. B01D 3/06; B01D 3/10; B01D 3/34; B01D 3/42
(52) U.S. Cl. ................................ 203/1; 203/3; 203/33; 203/37; 203/78; 203/79; 203/80; 203/99; 203/88; 203/90; 203/DIG. 19; 159/2.1; 159/27.3; 159/4.2; 159/48.1; 159/901; 159/DIG. 16; 159/DIG. 23; 159/DIG. 20; 210/712; 210/737; 210/739
(58) Field of Search .................. 203/DIG. 25, DIG. 8, 203/99, DIG. 19, 100, 88, 1, 2, 3, 33, 78–80, 37, 36, 90; 159/47.1, 27.3, 44, 48.1, 901, 2.1, 4.2, DIG. 23, DIG. 20, DIG. 16; 210/712, 737, 739, 713; 165/108, 110, 119

(56) References Cited

U.S. PATENT DOCUMENTS

| | | | | |
|---|---|---|---|---|
| 3,925,148 A | * | 12/1975 | Erwin | .......................... 159/23 |
| 3,954,566 A | | 5/1976 | Rajakovics | |
| 4,119,485 A | * | 10/1978 | Erwin | |
| 5,993,608 A | | 11/1999 | Abry et al. | |

FOREIGN PATENT DOCUMENTS

| | | |
|---|---|---|
| EP | 0 118 308 | 9/1984 |
| EP | 0460917 | * 11/1991 |
| WO | 31445 | * 7/1998 |

OTHER PUBLICATIONS

Philip Hayhoe, Glycol purification–a novel approach to an old problem, Article form the New Zealand Journal of Engineering, Jun. 1993.

* cited by examiner

Primary Examiner—Virginia Manoharan
(74) Attorney, Agent, or Firm—Timothy J. Keefer; Wildman, Harrold, Allen & Dixon LLP

(57) ABSTRACT

This invention relates to a continuous process and an apparatus (1) for removing dissolved and undissolved solids and/or high boiling point liquid contaminants from a mixture of miscible liquids (9). A recycle liquor stream (6) is fed at high velocity through a heat exchanger having a single flow path (12) and the heat added by the heat exchanger is sufficient to vaporize the feed stream (2) when the recycle liquor and feed stream are mixed upon delivery to the separation vessel (3).

27 Claims, 5 Drawing Sheets

PROCESS AND APPARATUS FOR REMOVING DISSOLVED AND UNDISSOLVED SOLIDS FROM LIQUIDS

CROSS REFERENCE TO RELATED APPLICATION

This application claims the priority of New Zealand patent application Serial No. 332331 filed on Oct. 15, 1998.

This invention relates generally to a process and apparatus for removing dissolved and undissolved solids from liquid mixtures.

BACKGROUND presence of unwanted dissolved or undissolved solids or high boiling contaminants in process liquids can result in any one or a combination of the following difficulties; the contamination of sales products; the release of pollutants into the atmosphere and waterways; fouling or scaling of heat exchangers, reboilers, cooling circuits in internal combustion engines, other equipment and pipework; foaming in process equipment; high pumping or heating costs; inefficient energy use; accelerated corrosion or erosion; and/or undesirable chemical reactions.

The remedial measures required to restore satisfactory performance often include: batch extraction of the solids from the process streams; the use of additives to prevent or counteract foaming, corrosion and the like; purchase of replacement clean process liquid; the use of toxic or hazardous chemicals to remove fouling deposits and scale; shutdowns of the process plant to clean fouled equipment; and the repair or replacement of corroded or eroded items.

Furthermore, often the remedial measures increase the risk of polluting the environment because of the need to dispose of cleaning solutions, additives and contaminated process liquids.

It is an object of the present invention to overcome or substantially reduce in severity the above mentioned difficulties, or to at least provide the public with a useful choice.

SUMMARY OF THE INVENTION

In a first aspect the present invention provides a continuous process suitable for extracting dissolved and undissolved solids and/or high boiling point liquid contaminants from a mixture of miscible liquids in which at least one liquid component boils at a temperature substantially greater than the remaining liquid component(s), in which the undissolved solids and any precipitated dissolved solids are more dense than the liquid components of the liquid mixture, and in which the liquids remain free-flowing at a selected operating temperature and pressure throughout the process, the process including the steps of:

introducing a feed stream of the miscible liquid mixture into a separation vessel;

rapidly boiling or flashing the feed stream after mixing the stream with a recycle liquor to produce a vapour in proximity or within the separation vessel;

separating the vapour from the unvaporised components of the co-mingled feed stream and recycle liquor;

collecting the unvaporised liquid and solids in a substantially liquid pool in a lower portion of the separation vessel, removing a recycle liquor stream from the liquid pool at a rate substantially equal to at least ten times the feed stream flow rate from a substantially upper portion of the liquid pool so as to obtain a recycle liquor containing a substantially low percentage of undissolved solids;

pumping the recycle liquor stream through a heat exchanger which rate of pumping is sufficiently high to maintain a significant flow rate of the recycle liquor through the heat exchanger;

supplying a sufficient heat flux to the recycle liquor in the heat exchanger such that the amount of heat added to the recycle liquor is sufficient to vapourise the feed stream when the recycle liquor and feed stream are mixed; and extracting the solids and/or high boiling point liquids from the lower portion of the separation vessel.

In a further aspect the present invention provides an apparatus for removing dissolved or undissolved solids and/or high boiling point liquid components from liquid mixtures, the apparatus comprising;

a separation vessel, into which a feed stream of miscible liquid mixtures is delivered;

a solids extraction means located proximate to the separation vessel, which is adapted to extract the solids from the miscible liquids in the separation vessel, a recycle circuit adapted to transfer a mixture of liquids in the form of a recycle liquor from the separation vessel through a heat exchanger located externally from the separation vessel, and back to the separation vessel, and in which the heat exchanger is dimensioned and adapted to provide heat flux sufficient to vaporise the feed stream when the recycle liquor and feed stream are mixed upon delivery into the separation vessel.

Further aspects of this invention which should be considered in all its novel aspects will become apparent from the following description given by way of example of possible embodiments thereof, and in which reference is given to the accompanying drawings in which:

FIGS. 1 and 1a provide very schematically an outline of an apparatus used in a process for removing dissolved and/or undissolved solids from liquids.

DETAILED DESCRIPTION OF THE INVENTION

Figure 1:
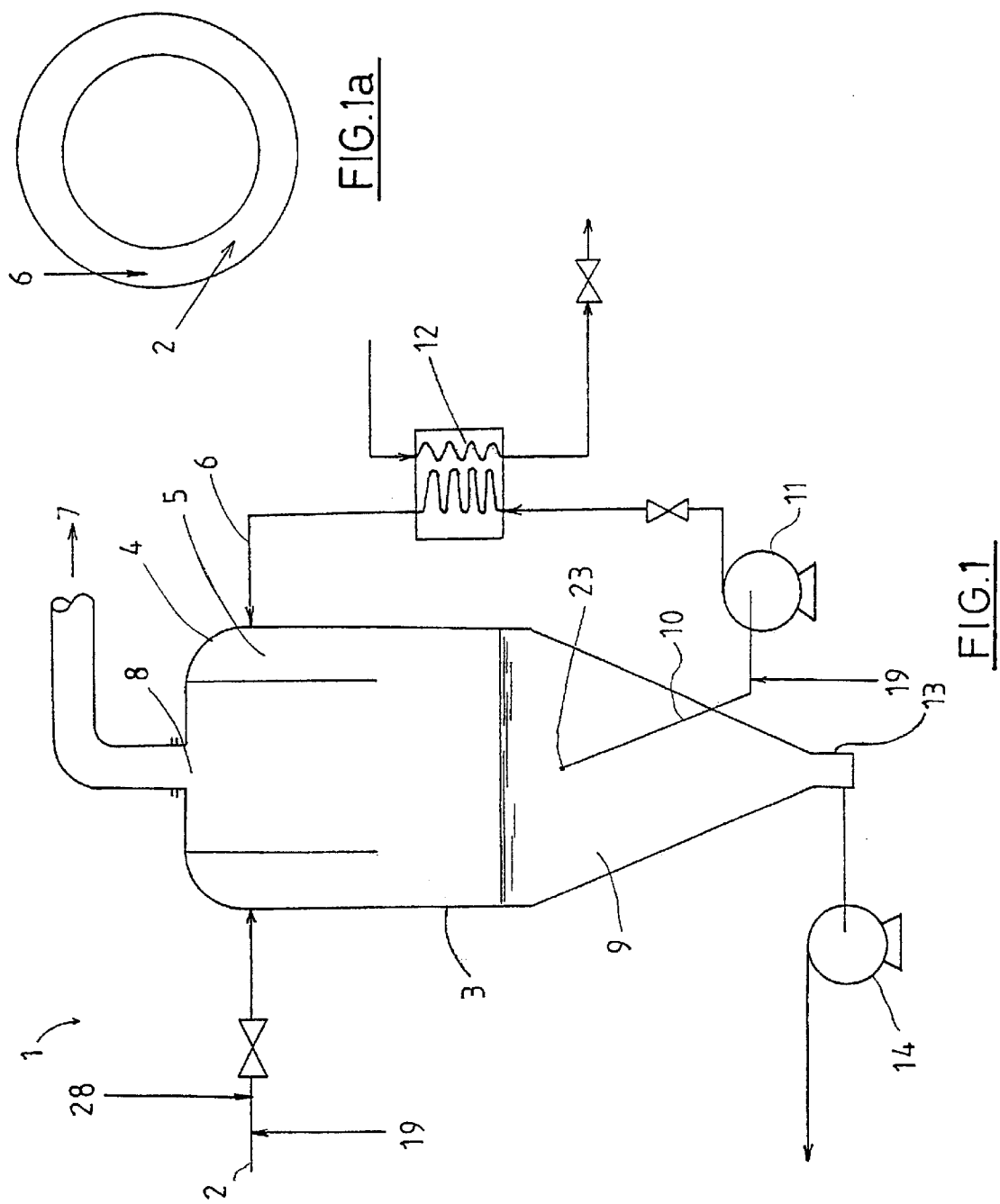

An apparatus 1 for removing dissolved and/or undissolved solids from liquids is illustrated in FIG. 1. The feed stream 2 is a free flowing mixture of two or more miscible liquids that contain solids (dissolved solids and/or undissolved solids). One or more of the liquid component(s) boils at a significantly higher temperature than the other liquid components. Examples of such mixtures include engine coolant/water, methanol/water, amines/water, and light oil/ heavy oil mixtures, contaminated with dissolved salts, corrosion products, solids and/or liquids generated by oxidation or thermally induced decomposition or other chemical reactions, and/or fine suspended mineral or metallic particles.

It is envisaged that if the feed stream 2 contains only one liquid or does not contain a mixture of liquids having sufficient differences in boiling points, a miscible liquid which has a different boiling point may be added to the feed stream. For example, water may be an acceptable choice for adding to non-hydrocarbon feed streams.

It is desirable, but not essential, for the feed stream 2 to be pressurised and/or heated until it is near boiling before it enters the separation vessel 3. The separation vessel is preferably a flash separator and is described as such throughout the remaining description. It is also desirable, but not essential, to flash off unwanted vapours and separate out unwanted non-miscible liquids from the feed stream 2 before it enters the flash separator 3.

The feed stream 2 enters the flash separator 3 through one or more tangential nozzles (not shown) at a temperature and pressure sufficient so that the feed stream travels at high velocity across the inner surface 4 of the outer wall of the annular chamber 5 in the upper part of the flash separator 3. The feed stream 2 mixes with a larger and hotter stream of recycle liquor 6 that has entered the flash separator 3 at high velocity in the same rotational direction as the feed stream 2, as illustrated in FIG. 1a. The recycle liquor 6 enters the flash separator through one or more tangential nozzles (not shown). The recycle liquor 6 preferably immediately heats the feed stream 2 and thereby causes the feed stream to boil rapidly or flash. Alternatively, the feed stream 2 and recycle liquor 6 may be mixed immediately upstream of the flash separator 3 and the comingled streams injected into the flash separator 3 at high velocity through one or more tangential nozzles.

The vapour 7 generated by the flashing feed stream 2 expands to fill the annular chamber 5 in the flash separator 3. The vapour 7 flows downwards to reach the opening of the outlet channel whereupon it reverses direction to flow upwards through the outlet channel 8. The vapour 7 passes through conventional mist elimination devices (not shown) to remove entrained fine liquid droplets and leaves the flash separator 3. This vapour contains essentially no solids unless there is significant carryover of small particles or liquid droplets into the vapour. This also depends upon the performance of the mist elimination devices. Numerous existing methods are known, by which the vapour 7 is stripped of entrained liquids or solids and/or is separated into its various components by equipment located downstream of the flash separator 3 (e.g. distillation or semi-permeable membranes).

The solids and unvaporised liquid in the mixed feed and recycle liquor streams in the flash separator 3 follow a spiral path downward along the inner surface of the shell of the flash separator and enter a liquid pool 9 of this same material in the lower half of the flash separator. The flash vaporisation that has occurred ensures that the liquid pool is composed mainly of the higher boiling point liquid components. Liquid, namely recycle liquor 6, is preferably drawn from the upper portion of liquid pool 9 and enters the recycle circuit 10 where it is pumped by the recycle pump 11, heated by the recycle heater 12 and injected at high velocity into the flash separator 3 to mix with the feed stream as described above.

The liquid pool 9 in the flash separator 3 becomes saturated with dissolved solids and remains saturated or super-saturated and laden with undissolved solids for all normal operating conditions. The dissolved solids carried into the flash separator by the feed stream 2 continually precipitate and add to the quantity of undissolved solids already present in the liquid pool 9. The undissolved solids being denser than the surrounding liquid descend to settle into a solids extraction chamber at the bottom of the flash separator 3.

The solids and a portion of the high boiling point liquids may be removed from the bottom of the flash separator 3 in a slurry by a suitably designed solids extraction pump 14. Because the flowrate of the slurry is typically less than 1% of the recycle liquor flowrate, slurry extraction does not create a substantial flow disturbance in the flash separator 3.

Figure 2:
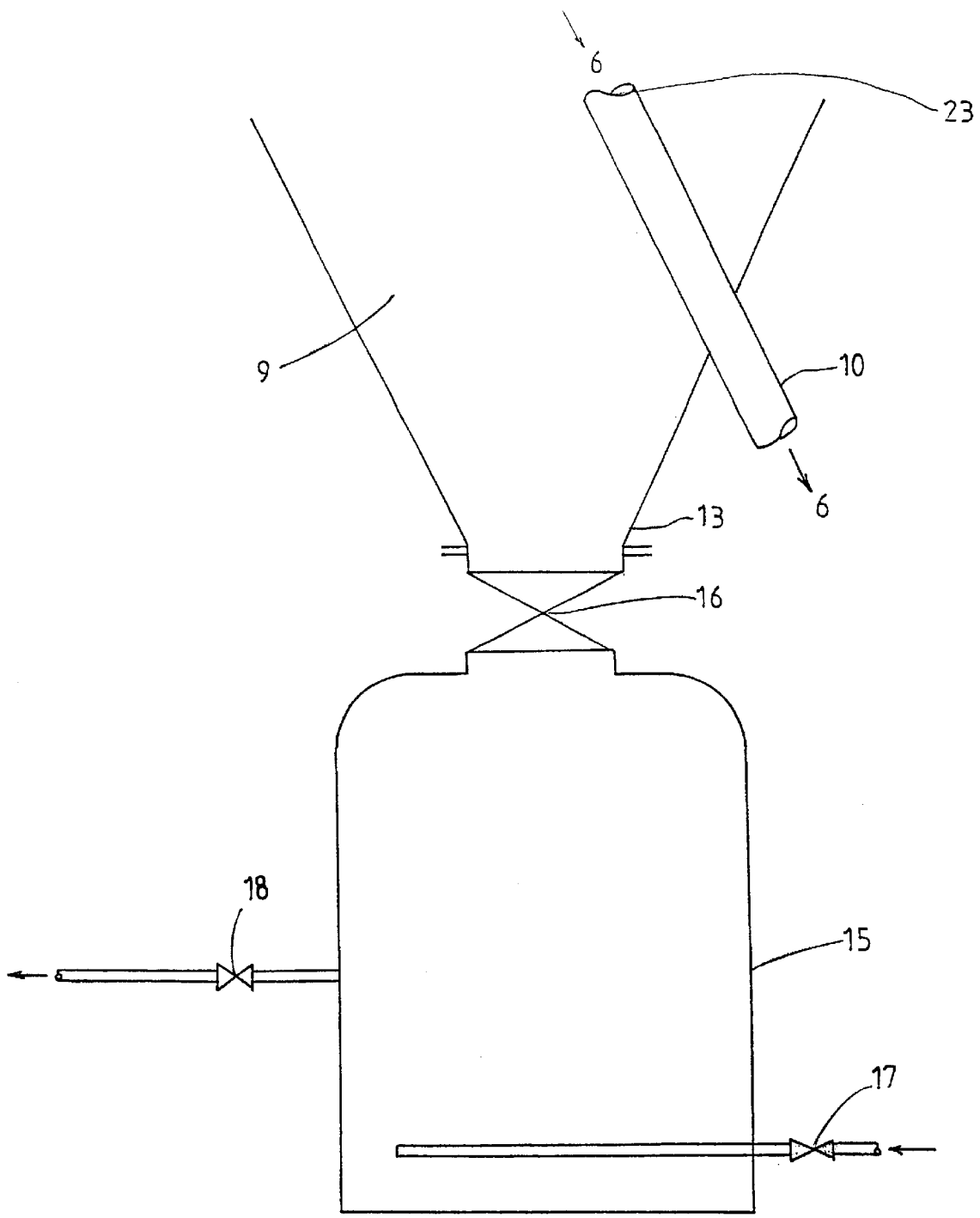
FIG. 2 shows schematically an embodiment of a separation vessel of the process as illustrated in FIG. 1, in which a solids drum is installed directly beneath the separation vessel.

Alternatively in a further embodiment a solids drum 15 may be installed directly below the flash separator as illustrated in FIG. 2. The interconnecting valve 16 between the solids drum and the flash separator is left open to allow solids to freely settle into the solids drum and to slowly displace the liquid in the solids drum 15. The solids drum 15 is emptied of accumulated solids when necessary. Preferably, this emptying is achieved without shutting down the process. Several ways of emptying are envisaged and include:

a) shutting the interconnecting valve 16, opening valve 17 to allow a small portion of the flow from the pressure side of the recycle pump 11 to flow through a lance located inside the solids drum to agitate and pressurise the settled solids, opening the outlet valve 18 from the solids drum to allow the contents to flow to settling tanks or other process equipment, and then shutting valves 17 and 18 and opening valve 16 when the solids transfer is finished, or b) employing an extraction pump capable of drawing out the settled solids from the solids drum 15 without assistance from the recycle pump 11, or c) shutting valve 16, removing the solids drum 15 for a short time for emptying or replacing with another drum, and then reopening valve 16 before an excess of solids has accumulated in the bottom of the flash separator 3.

For the in-situ methods a) and b) described above the solids drum 15 remains filled with either liquid or liquid/solid mixture and preferably at no time under normal operating conditions contains vapour. Because the liquid 9 in the solids drum 15 is essentially not flowing into or out of the solids drum the liquid tends to cool down to ambient temperature. For many applications it has been found to be safe for personnel and cost effective to not insulate the solids drum 15.

Most of the liquid in the slurry that is removed from the solids drum 15 or the flash separator 3 by the solids extraction pump 14 can be recovered by flowing the slurry through settling tanks, hydrocyclones, centrifuges and/or filters. This concentrates the solids into a sludge or cake and thereby allows decanted liquid to be recovered and returned to the feed stream 2 or recycle circuit 10.

For many applications it has been found to be safe and cost effective to construct the settling tanks from polymers such as polyethylene.

For applications that seek to specifically remove some high boiling point liquids, such as the decontamination of amines used in refineries for acid gas control, some or all of the slurry or the decanted liquid from the slurry may be discarded to waste. Alternatively, or in addition to these measures a second stage of vaporisation may be added to reduce the loss of lower boiling point liquids in the waste products. In this case a portion of the recycle liquor 6 flows from the outlet of the recycle heater 12 through a flow control valve and into a small second separator 20.

Sufficient heat is added in the recycle heater 12 to ensure that the liquid flashes as it enters the second separator 20 which is preferably a cyclone separator. The vapour so generated flows into the common vapour line connected to the outlet of the main flash separator 3. The solids and unvapourised liquids 22, which are now more depleted of lower boiling point components, exit the bottom of the small cyclone separator 20 and flow into the solids extraction chamber in the flash separator 3 or into the solids drum 15 or directly to waste. Because there is no mixing with the feed stream liquid 2 the second separator 20 operates at a higher equilibrium temperature than the main flash separator 3, but at the same pressure.

Figure 3:
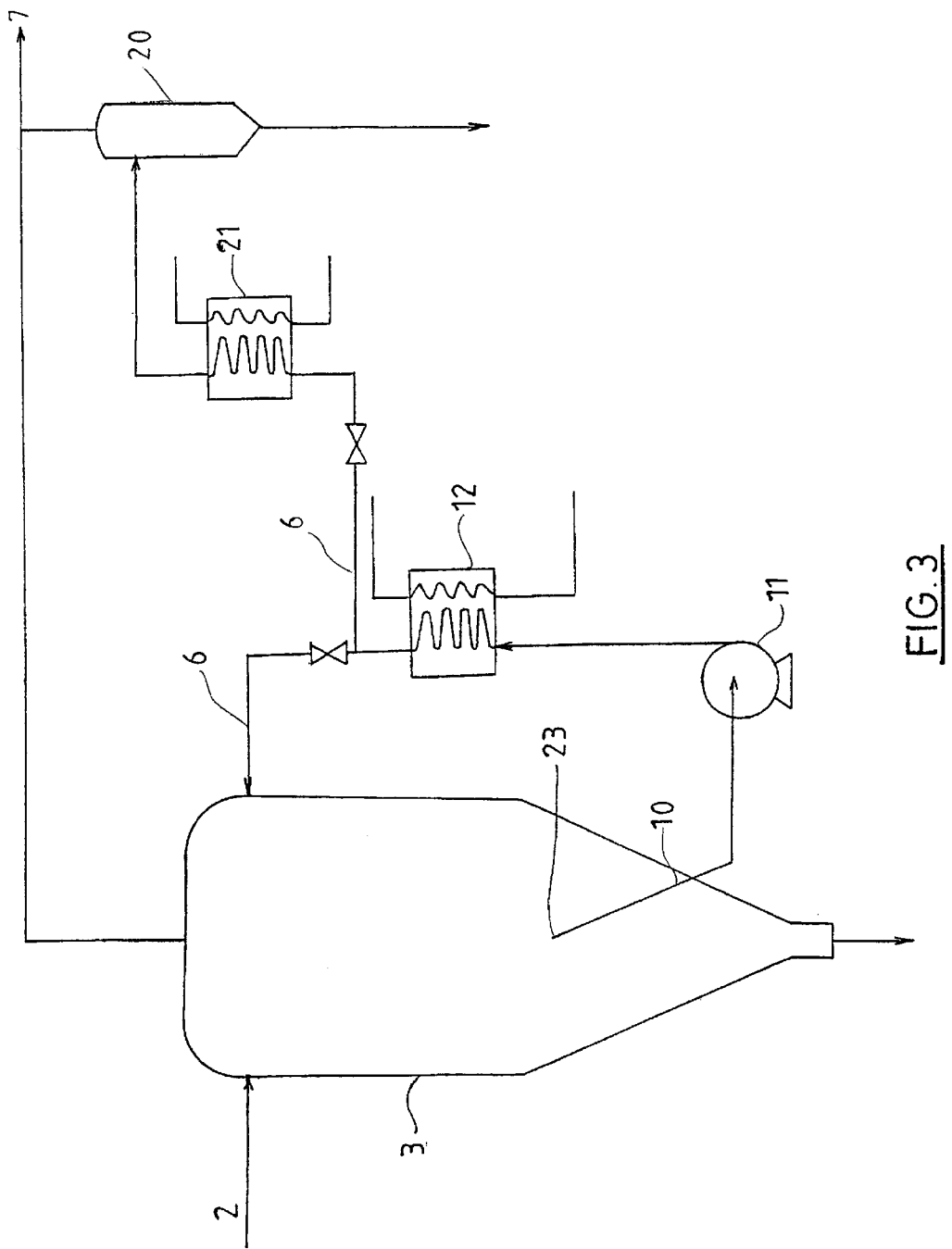
FIG. 3 shows very schematically a further embodiment of the apparatus for the process for removing dissolved and undissolved solids from liquids, in which a further heat exchanger is located between a recycle heater and a further separation vessel.

The efficiency of the extraction of high boiling point components can be improved by adding a second heat exchanger 21 between the recycle heater 12 and the second separator 20 to add more heat to the portion of the recycle liquor 6 flowing to the second separator 20. This is illustrated in FIG. 3. This provides greater flexibility to optimise the temperature and flowrate in the second separator with less disturbance to the performance of the recycle heater 12. In this configuration the loss of lower boiling point liquids to waste is minimised by disposing of liquid from the second separator to waste and recovering and reprocessing as much decanted liquid 19 as possible from the solids extraction system described above.

The entrance 23 to the recycle circuit through which the recycle liquor 6 exits the flash separator 3 is preferably located in the upper portion of the liquid pool near or at the vertical centreline of the flash separator 3. Because the solids and liquids follow a substantially downward spiral path along the wall of the flash separator 3, the solids enter the liquid pool at its outer edge and continue to flow along the wall of the flash separator 3 as well as in a substantially downwards direction. The suspended solids that are carried by the liquid flowing towards the recycle entrance 23 travel substantially along spiral paths which provide some time for the heavier particles to descend below the recycle entrance 23 and thereby not be carried into the recycle circuit. Such positioning of the entrance 23 to the recycle circuit provides useful primary separation of solids from the liquid and significantly reduces the risk of fouling, erosion, and unnecessary maintenance of or premature failure of the equipment, valves and pipework in the recycle circuit.

Figure 4:
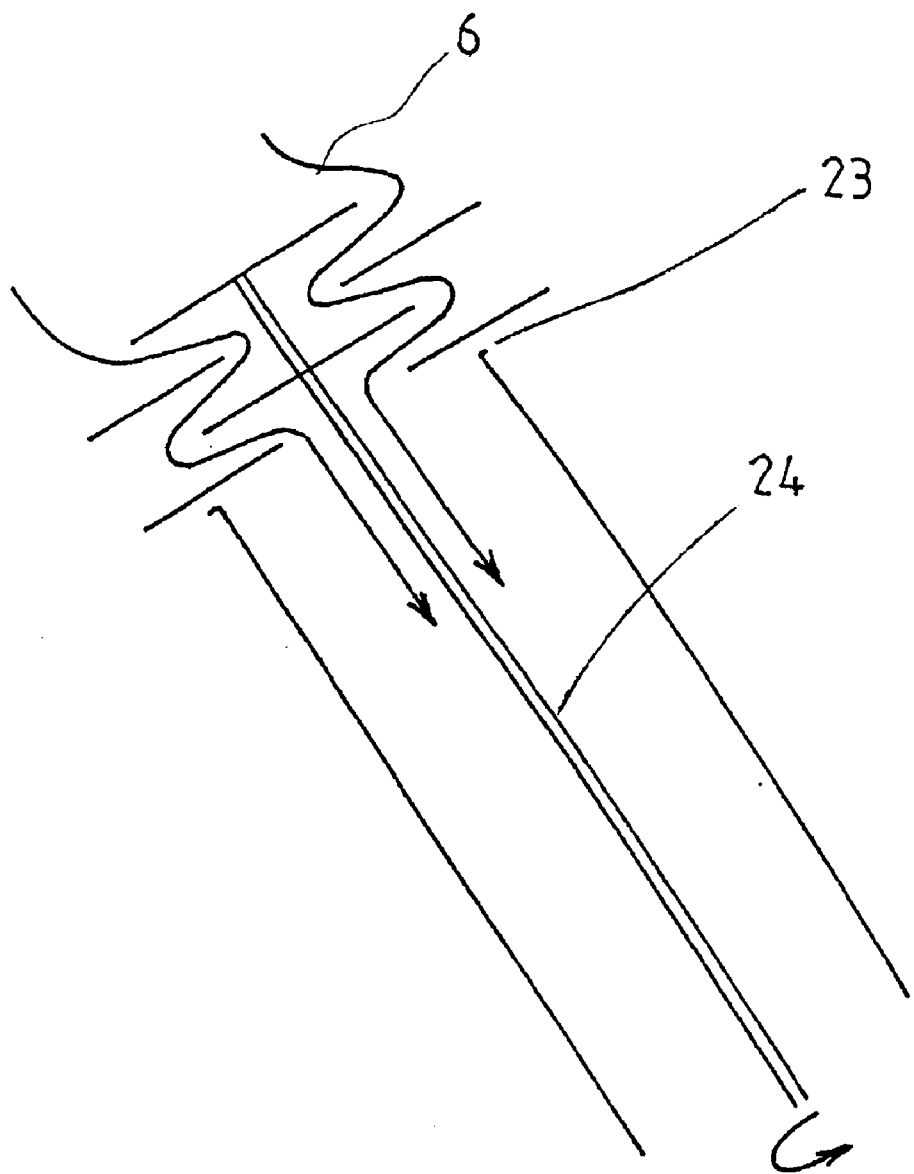
FIG. 4 shows very schematically a disc spinner device which may be installed at the entrance of the recycle circuit in an embodiment of the present invention.
Figure 5:
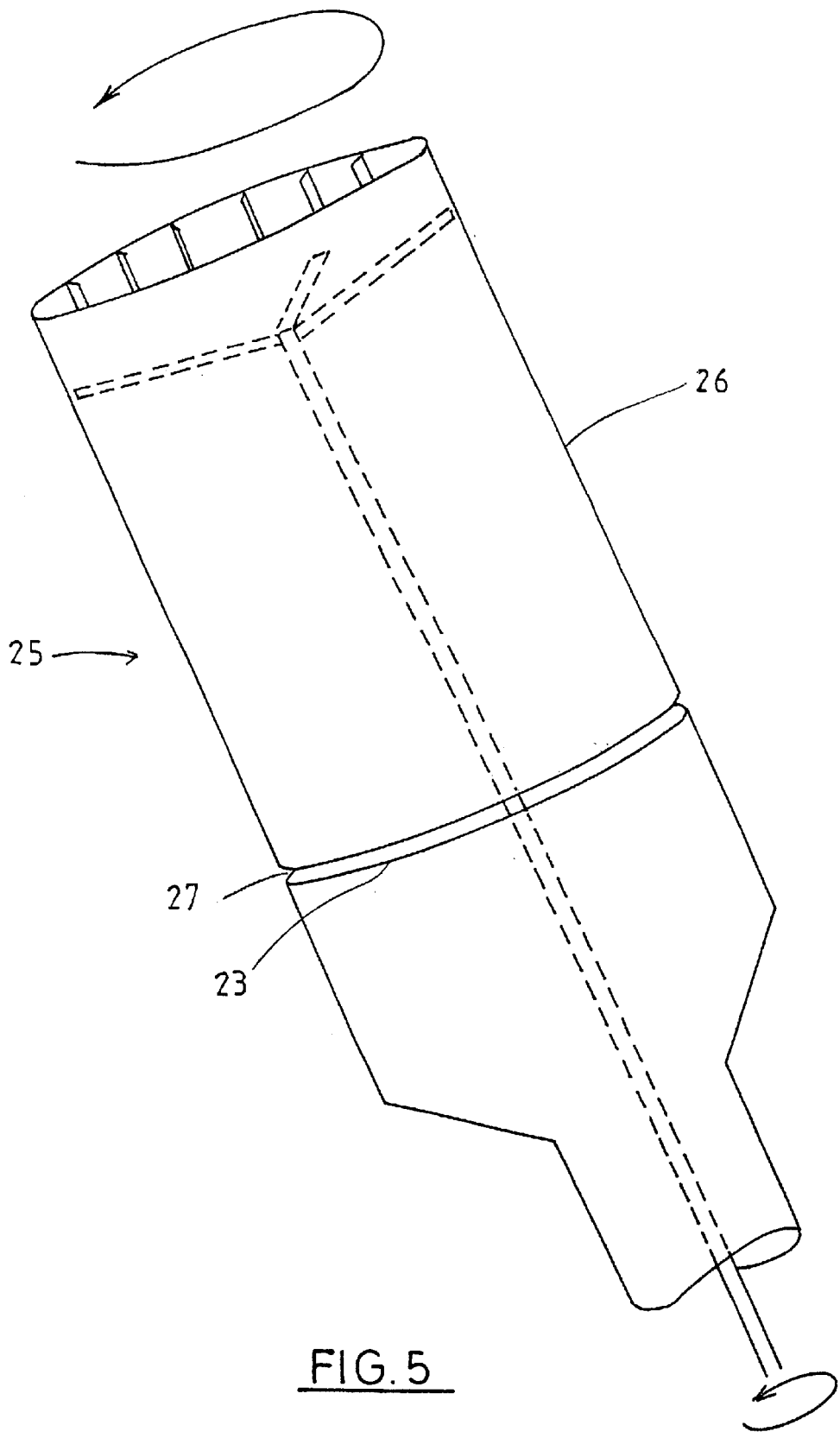
FIG. 5 shows very schematically a tube spinner device which may be installed at the entrance of the recycle circuit in an embodiment of the present invention.

The separation of solids from the recycle liquor can also be further assisted by:
  a) installing a disc spinner device 24 at the entrance 23 to the recycle circuit. Such a device 24 is illustrated in FIG. 4 and can be either self-powered by the flow of liquid or motor driven. The rotation of the disc spinner 24 generates centrifugal forces that assist in separating the particles from the liquid. The device 24 is effective from low to high rotational speeds and requires substantially low power to operate because it is not designed to displace liquid. The recycle liquid 6 is less affected by the centrifugal action of the spinner and flows through the device 24. If necessary, this liquid may flow through one or more straightening vanes and into the recycle pump 11; or
  b) installing a tube spinner device 25 at the entrance 23 to the recycle circuit. A tube spinner device 25 is illustrated in FIG. 5. The rotation of the tube spinner device 25 imparts a spin and centripetal acceleration to the recycle liquor 6 as it flows through the tube 26. The tube spinner device 25 generates centrifugal forces that help to separate the particles from the liquid by pushing the denser particles towards the wall of the rotating tube 26 and back out into the liquid pool through the gap 27 between the rotating tube 25 and the recycle entrance pipe 23. The tube spinner 25 is effective from low to high rotational speeds. The tube spinner 25 requires low power to operate because it is not designed to displace liquid. The recycle liquid 6 is less affected by the centrifugal action of the spinner and flows through the device and, if necessary, through straightening vanes and into the recycle pump 11.

The recycle pump 11, which can be a conventional centrifugal pump for many applications of this invention, provides the pressure to drive the recycle liquor 6 at high velocity through the recycle heater 12 with minimal or substantially no boiling and into the flash separator 3.

For most applications the recycle heater 12 has a single narrow flow path. This is preferred to ensure that the flowing recycle liquor 6 sweeps out solids that might otherwise accumulate or cause fouling or scaling on the hot surfaces of the recycle heater 12. The recycle liquor 6 may flow either co-currently or counter-currently to the heating medium in the recycle heater 12. A spiral heat exchanger is suitable for this purpose. A spiral heat exchange is substantially self-cleaning, compact and lightweight. By employing the spiral type of heat exchanger the size, weight and cost of the process equipment can be reduced. It is possible to achieve a very high heat flux preferably between about 30 to about 160 kW/m2 for amines and glycols. This heat flux range is significantly higher than the typical maximum heating rates of 20 to 30 kW/m2 conventionally recommended in other processes for regenerating these liquids. The liquid 6 flows through the recycle heater 12 in a time of typically about 1 to 3 seconds at a velocity of approximately 3 to 10 m/s. Such conditions avoid lengthy contact with hot surfaces and thereby minimise or prevent thermal degradation or breakdown of the recycle liquor 6. This latter feature is important for decontaminating glycols, amines and other fluids that are prone to thermally induced degradation.

The heated recycle liquor 6 enters the flash separator 3 through the tangential nozzle(s) and may begin to flash because of the drop in pressure upon reaching the flash separator. The degree of flashing of recycle liquor 6 depends upon the amount of heat added to the recycle liquor 6, its pressure, and its boiling point. The recycle liquor 6 has a higher boiling temperature than the feed stream 2 and its flow rate is at least ten times higher. When the two fluids mix the heat transferred from the recycle liquor 6 to the feed stream 2 causes the feed stream 2 to flash.

For some applications involving the extraction of chlorides and other salts that can promote corrosion this invention includes the option of injecting an oxygen scavenging chemical such as a sulphite and/or sodium bi-sulphite compound into the feed stream 2. Such a point of injection 28 is illustrated in FIG. 1. This option provides the possibility of constructing the apparatus from lower cost materials such as carbon steel or stainless steel. Sulphite and/or sodium bi-sulphate compounds may also convert some partially soluble or insoluble solids to soluble sulphites and/or sulphates that can be more easily removed in the apparatus.

For some applications of this invention including the decontamination of glycol the control of the risk of corrosion by injecting sulphite or bi-sulphite as described above allows the process to stabilise in a slightly acidic state without a high risk of corrosion. This slightly acidic state can raise the solubility of many contaminants that might otherwise precipitate out in a troublesome manner before reaching the flash separator 3. If an acidic state is undesirable or if it is desirable to neutralise acidic components in the feed stream, as is often the case when decontaminating alkaline liquids such as aqueous amine solutions, then chemicals that raise the pH of the feed stream such as caustic can be added, also at point 28 as illustrated in FIG. 1. The salts or other solids that may form as a result can be extracted in the flash separator 3. The addition of caustic to amine feed streams that are contaminated with acidic compounds often helps to liberate the amines and make them more effective.

It is an advantage of the present invention that several inherently stable naturally occurring equilibrium processes act to prevent excessive transients or unstable behaviour. It follows that a complex control system is not required.

The inherently stable naturally occurring equilibrium processes are:

a) the solids content of the recycle liquor 6 stabilises at a significantly lower level than the average solids content of the liquid pool 9 in the flash separator 3. It is possible to predict this level based on a consideration of the particle size distribution in the liquid pool, the density of the particles, the density and viscosity of the liquid, the dimensions of the flash separator 3, the amount of swirl in the liquid pool, the recycle liquor flowrate, the size and location of the recycle entrance 23, and the effectiveness of any special devices such as a disc or tube spinner;

b) the temperature in the flash separator 3 varies substantially in proportion to the boiling points of the components of the feed stream 2 (after accounting for the effect of any added liquids) at the prevailing pressure in the flash separator 3; the process substantially adjusts itself to variations in composition and boiling point of the feed stream liquid 2;

c) the recycle heater 12 heat output and recycle liquor flowrate can be directly controlled. There is no need for further adjustments in response to fluctuations in the temperature in the flash separator 3 unless the flash separator temperature moves outside an allowable range;

d) the process is stable over a near 100% turndown range; this is controlled by one variable, namely the heat added by the recycle heater 12;

e) the feed to the process is controlled passively by maintaining the level in the liquid pool 9 in the flash separator 3; apart from the initial filling operation, the feed stream 2 only enters the flash separator 3 when vapour is generated, which in turn is controlled by the heat added by the recycle heater 12.

The temperatures in the process rise and fall in response to rises and falls in the pressure in the flash separator 3. It is often desirable to operate the flash separator 3 at below atmospheric pressure to reduce the temperature requirements. For example, when decontaminating engine coolant or amines, which can degrade when exposed to high temperature, the flash separator 3 may be operated at 200 mbara or less. When processing an aqueous monoethylene glycol stream (the primary liquid in engine coolant) at a flash separator pressure of 100 mbara, the flash separator temperature can be kept below 100 degrees Celsius and below 115 degrees Celsius in the recycle heater depending on the amount of water in the feed stream. These operating temperatures are substantially cooler than conventional glycol regeneration processes. The low temperatures and short contact time with hot surfaces ensure that essentially no thermal degradation takes place.

The process temperatures can also be raised or lowered by adding to the feed stream 2 a miscible liquid that boils at a significantly higher or lower temperature respectively than the rest of the feed stream.

The materials of construction of the apparatus include any that are suitable for the particular application. In most applications carbon steel or stainless steel are appropriate. There may be a limited requirement for tougher materials such as titanium in the recycle heater 12 or special alloys in the recycle pump impeller. A spiral type recycle heater 12 is generally small and would typically cost less in titanium than a conventional carbon steel heat exchanger of a similar heat transfer capacity.

It is to be appreciated that the process of this invention is not intended to apply to feed streams that contain significant quantities of solids, which solids;

float or have densities that are close to or below the density of the heavier feed stream liquid(s); agglomerate or coagulate into very large clumps that cannot pass through the pipework at the bottom exit of the flash separator;

adhere firmly to the walls of the flash separator and solids drum;

or become gaseous at the temperature and pressure conditions in the flash separator.

It is also to be appreciated that the process of the invention does not apply to liquids that become solid or non-flowing at the pressure and temperature conditions that exist in the flash separator, solids drum, or recycle heater.

Where in the foregoing description reference has been made to integers having known equivalents thereof, then those equivalents are herein incorporated as if individually set forth.

Although this invention has been described with reference to particular embodiments and examples, it is to be appreciated that improvements or modifications can be made to the present invention without departing from the scope of the claims.

What we claim is:

1. A continuous process to extract at least one dissolved and/or undissolved solid and/or at least one high boiling point liquid contaminant from a mixture of miscible liquids, in which at least one liquid component boils at a temperature substantially greater than the remaining liquid, in which the undissolved solids and any precipitated dissolved solids are more dense than the liquid components of the miscible liquid mixture, and in which the liquids remain free-flowing at a selected operating temperature and pressure throughout the process, the process comprising the steps of:

introducing a feed stream of the miscible liquid mixture into a separation vessel;

rapidly boiling or flashing said feed stream by co-mingling said feed stream with a heated recycle liquor so as to produce a vapor in proximity or within the separation vessel;

separating the vapor from the unvaporized components of said co-mingled feed stream and heated recycle liquor;

collecting said unvaporized components in a substantially liquid pool in a lower portion of the separation vessel;

removing, at a rate substantially equal to at least ten times a flow rate of the feed stream, a portion of liquid from a substantially upper portion of said liquid pool so as to obtain a recycle liquor in which a concentration of solids is lower than a concentration of solids in the liquid that remains in the liquid pool;

pumping said recycle liquor through a single flow path recycle heat exchanger, which rate of pumping maintains a flow rate of at least 3 m/s of the recycle liquor through said recycle liquor heat exchanger;

supplying a sufficient heat flux to the recycle liquor in the recycle liquor heat exchanger such that the amount of heat added to the recycle liquor is sufficient to vaporise the feed stream when the heated recycle liquor and feed stream are co-mingled; and extracting solids from the lower portion of the separation vessel.

2. A continuous process according to claim 1 in which the feed stream enters the separation vessel through at least one tangential nozzle.

3. A continuous process according to claim 1 in which the heated recycle liquor enters the separation vessel through at least one tangential nozzle at a velocity that is sufficient so as to promote rapid co-mingling of said recycle liquor and the feed stream.

4. A continuous process according to claim 1 in which the recycle liquor heat exchanger is a spiral heat exchanger.

5. A continuous process according to claim 1 in which the process is operated under a partial vacuum.

6. A continuous process according to claim 1 in which the process includes the further step of introducing a sulphite or bi-sulphite compound to the feed stream.

7. A continuous process according to claim 1 in which the process includes the further step of adding a caustic substance to the feed stream to neutralise at least one acidic contaminant.

8. A continuous process according to claim 1 in which the feed stream is heated prior to entering the separation vessel so that at least one component of the feed stream is substantially at its boiling or flashing temperature as the feed stream enters the separation vessel.

9. A continuous process according to claim 1 in which the feed stream and the heated recycle liquor are mixed together prior to entering the separation vessel.

10. A continuous process according to claim 1, in which the feed stream is optionally processed prior to entering the separation vessel to remove vapors and/or unwanted non-miscible liquid.

11. A continuous process according to claim 1, in which the solids that collect in the separation vessel are extracted from the separation vessel with a solids extraction pump.

12. A continuous process according to claim 1 in which the process includes a further step of introducing a solids drum under the separation vessel to collect the solids that settle towards the bottom of the separation vessel so as to facilitate the removal of said solids.

13. A continuous process according to claim 12 in which said solids drum remains uninsulated to promote cooling of the contents to an ambient temperature.

14. A continuous process according to claim 1 in which a mixture of solids and liquids is extracted continuously or periodically from the liquid pool in the lower portion of the separation vessel.

15. A continuous process according to claim 14 in which a mixture of solids and liquids that has been extracted from the separation vessel is further processed so as to recover a decanted liquid, which liquid is subsequently mixed with the miscible liquid mixture prior to entering the separation vessel.

16. A continuous process according to claim 1 further comprising the step of removing a portion of the recycle liquor flow downstream of the recycle liquor heat exchanger to a further separation vessel.

17. A continuous process according to claim 16 in which said portion of the recycle liquor is further vaporised in said further separation vessel.

18. A continuous process according to claim 17 in which said portion of the recycle liquor prior to entering the further separation vessel is further heated in a heat exchanger to promote vaporisation in the further separation vessel.

19. A continuous process according to claim 18 in which an unvaporised mixture of liquids and solids is extracted from said further separation vessel.

20. A continuous process according to claim 1, wherein a further miscible liquid, which boils at a different temperature from at least one liquid component in the feed stream, is added to the feed stream to provide a sufficient difference between boiling points of the vaporised liquids and the liquid pool in the separation vessel.

21. A continuous process according to claim 20, in which said further miscible liquid is water or an alcohol.

22. A continuous process according to claim 1 in which a disc or tube spinner device is installed at a point where the recycle liquor is removed from the liquid pool in the separator vessel so as to reduce the concentration of solids in the recycle liquor.

23. A continuous process of claim 1 wherein:

the separation vessel is adapted to optionally operate under a partial vacuum, into which said feed stream and the heated recycle liquor are delivered and within which said feed stream and heated recycle liquor are co-mingled;

the separation vessel includes an opening in an upper portion thereof through which flows the vapor produced as a result of said co-mingling of the feed stream and heated recycle liquor;

the lower portion of the separation vessel includes an entrance to a recycle circuit comprising a recycle pump coupled to the single flow path recycle heat exchanger and a conduit arrangement coupled to the heat exchanger and the pump, the conduit arrangement conveying said recycle liquor through the recycle pump and the recycle liquor heat exchanger, through which entrance liquid enters from the substantially upper portion of the liquid pool so as to obtain the recycle liquor having the concentration of solids that is lower than the concentration of solids in the liquid that remains in the liquid pool;

said recycle pump is adapted to pump said recycle liquor through said recycle liquor heat exchanger at a velocity of at least 3 meters per second and back to the separation vessel;

said single flow path recycle liquor heat exchanger is adapted to provide heat sufficient to vaporise the miscible liquid mixture when the heated recycle liquor and feed stream are co-mingled upon delivery into the separation vessel;

a vacuum pump is coupled to the separation vessel and is adapted to provide a partial vacuum in the separation vessel; and a solids extraction device is located under the separation vessel and is adapted to collect or extract solids that settle towards a bottom of the separation vessel to facilitate the extracting of said solids.

24. A continuous process according to claim 23, in which a disc or tube spinner device is installed at the entrance to the recycle circuit.

25. A continuous process according to claim 23, further comprising:

injecting the feed stream and recycled liquor and upper portion of the separation vessel into an annular chamber of the separation vessel.

26. A continuous process of claim 25 in which the feed stream is delivered into the annular chamber through at least one tangential nozzle.

27. A continuous process of claim 26, in which the heated recycle liquor is delivered into the annular chamber through at least one tangential nozzle.

* * * * *